(12) United States Patent
Hiraishi

(10) Patent No.: US 6,517,914 B1
(45) Date of Patent: Feb. 11, 2003

(54) ANISOTROPIC LIGHT-SCATTERING FILM

(75) Inventor: Masanori Hiraishi, Osaka (JP)

(73) Assignee: Daicel Chemical Industries, Ltd., Osaka (JP)

( * ) Notice: Subject to any disclaimer, the term of this patent is extended or adjusted under 35 U.S.C. 154(b) by 315 days.

(21) Appl. No.: 09/667,002

(22) Filed: Sep. 21, 2000

(30) Foreign Application Priority Data

Sep. 21, 1999 (JP) ............................................ 11-267309
Jul. 26, 2000 (JP) ........................................ 2000-225547

(51) Int. Cl.[7] ........................ G02F 1/1335; C09K 19/00
(52) U.S. Cl. ........................................ 428/1.1; 349/112
(58) Field of Search ........................... 428/1.1, 1.2, 131, 428/138, 141–143, 148; 156/244, 11, 244.24; 349/112

(56) References Cited

FOREIGN PATENT DOCUMENTS

| JP | 4314522 | 11/1992 |
|---|---|---|
| JP | 7261171 | 10/1995 |
| JP | 10333141 | 12/1998 |
| JP | 11142843 | 5/1999 |

*Primary Examiner*—Mark F. Huff
*Assistant Examiner*—Jennifer R. Sadula
(74) *Attorney, Agent, or Firm*—Birch, Stewart, Kolasch & Birch, LLP

(57) ABSTRACT

Use in made of a film (anisotropic light-scattering film) having a light scattering characteristic $F(\theta)$ satisfying the following relation relevant to the relation between the angle of light scattering $\theta$ and the intensity of scattered light F over a range of $\theta=4$ to $30°$:

$$Fy(\theta)/Fx(\theta)>5$$

where $Fx(\theta)$ represents the scattering characteristic in the direction of the X-axis of the film 10 and $Fy(\theta)$ represents the scattering characteristic in the direction of the Y-axis of the film 10. This film 10 is composed of a continuous phase and a particulate dispersed phase 11, the difference in the index of refraction between which is not less than 0.001, with the mean aspect ratio of dispersed phase particles being not less than 1 and the direction of the major axis of each dispersed phase particle being oriented in the direction of the X-axis of the film 10. The continuous phase can be composed of a crystalline resin and the dispersed phase can be composed of a noncrystalline resin. The film may contain a compatibilizing agent. The anisotropic light-scattering film assures a uniform surface emission with close tolerances and without compromise in luminance.

20 Claims, 4 Drawing Sheets

F I G. 1
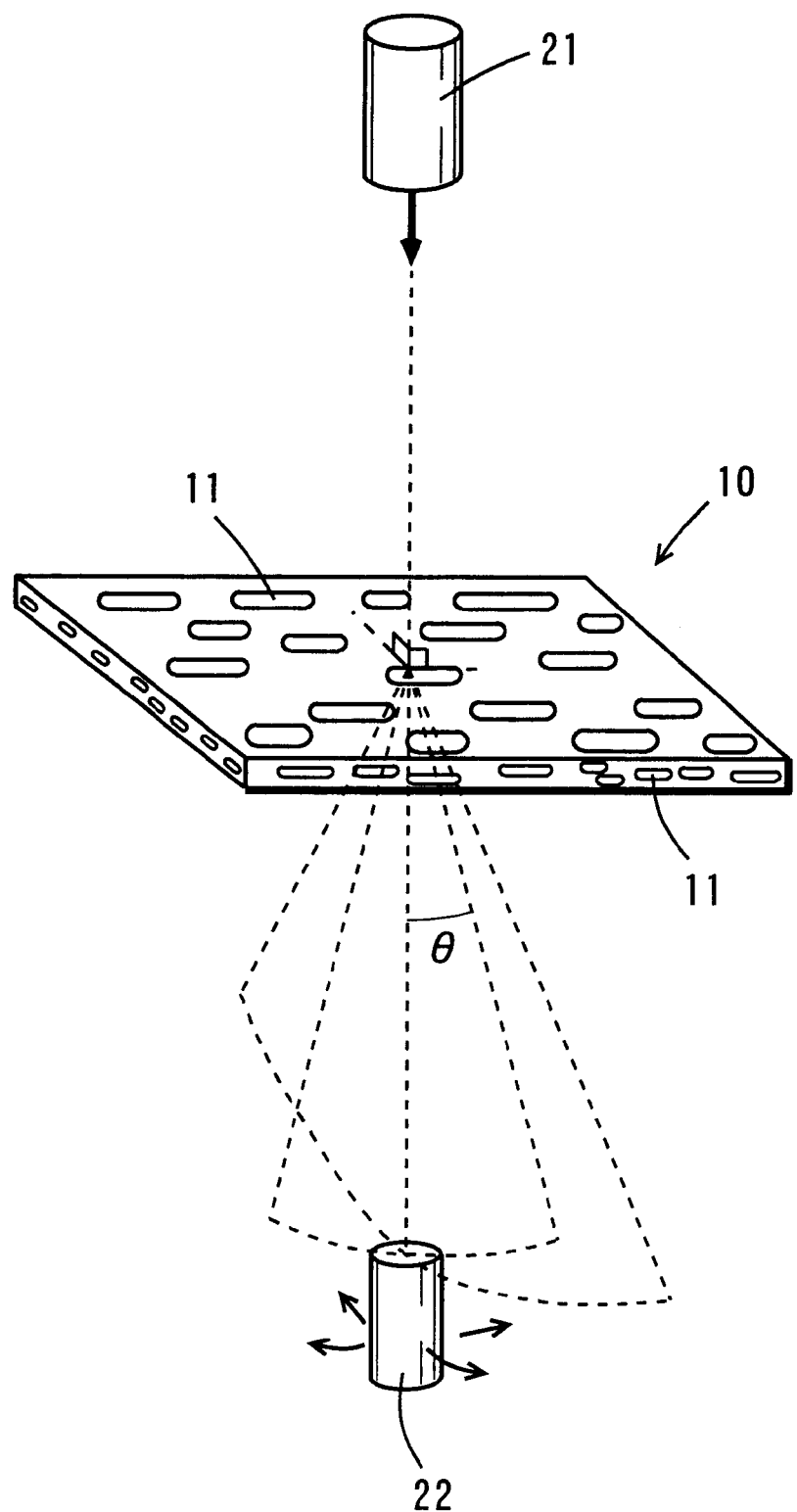

ANISOTROPIC LIGHT-SCATTERING FILM

FIELD OF THE INVENTION

The present invention relates to an anisotropic light-scattering film which is useful for assuring a uniform light emission on a display device (a flat-type surface display device), a method of producing the same, and a display device utilizing the film. More particularly, the invention relates to an anisotropic light-scattering film which is useful for transmission type (mode) or reflection type (mode) liquid crystal display or projection television.

BACKGROUND OF THE INVENTION

Among surface display devices (illumination devices) such as a liquid crystal display device, there is known a reflection type display device comprising a light reflecting layer formed on the back of a liquid crystal display module so that the light incident on the front surface is reflected by the light reflecting layer. Also known is a backlight type (transmission type) display device comprising a fluorescent tube disposed behind or on a lateral side of a liquid crystal display module. In the arrangement where the fluorescent tube is disposed on a lateral side, a light guide for causing the light from the fluorescent tube to emerge in the frontal direction is disposed on the back side of the liquid crystal display module [Japanese Patent Application Laid-Open No. 333141/1998 (JP-A-10-333141)].

However, in such liquid crystal display devices, the uniformity of the displayed image is sometimes low. For example, when the display device described in the specification of Japanese Patent Application Laid-Open No. 333141/1998 referred to above is used, the luminance distribution is not uniform in the direction normal to the longitudinal axis of the fluorescent tube, with a consequent marked variation in luminance, as is obvious from FIG. 14, FIG. 15 and FIG. 16 appended to the above specification.

For this reason, a light-scattering film (diffuser or diffusing film) is frequently used to diffuse the light from the fluorescent tube or the reflected light from the light reflecting layer to assure a uniform luminance. As the light-scattering film, a light-scattering film comprising a polycarbonate or polyester base film which is transparent and highly heat-resistant, and containing refractive microfine particles (resin beads) or light-transmitting inorganic microfine particles incorporated therein by coating or otherwise is generally employed.

Recent years have seen an increasing demand for such light-scattering films as the light-scattering film for the backlight component of the backlight type liquid crystal display device. The light-scattering film for backlight use is usually interposed between the backlight (cold cathode tube) and the liquid crystal layer to homogenize the light emitted from the cold cathode tube. However, when the scatting of light is too large, no sufficient emission luminance can be obtained. Therefore, an optical element such as a prismatic lens is interposed between the light-scattering film (diffuser) and the liquid crystal layer to thereby refract the diffused light so that the light will be incident perpendicularly on the liquid crystal display surface, thus upholding the luminance.

As the surface display device [i.e., a display device the image display area of which is a flat surface (a flat type display device)] which is equipped with a diffuser, the device illustrated in FIG. 4 is known. This device comprises a surface display module 45 (particularly a transmission type liquid crystal display module) and at least one fluorescent discharge tube (cold cathode tube) 41 which is adapted to illuminate the module from its back side. Disposed on the back side of the fluorescent discharged tube 41 is a reflector 42 for reflecting the light advancing toward the back side. Moreover a diffuser 43 for diffusing light to uniformly illuminate the module 45 is interposed between the fluorescent discharged tube 41 and the module 45 and a prism sheet 44 is disposed on the module side of the diffuser 43. This surface display module 45, in the case of a liquid crystal display module, comprises a first polarizing film 46a, a first glass substrate 47a, a first electrode 48a on the glass substrate, a first alignment layer 49a on the electrode, a liquid crystal layer 50, a second alignment layer 49b, a second electrode 48b, a color filter 51, a second glass substrate 47b, and a second polarizing film 46b as successively built up (laminated) in the order mentioned. In such a display device, the display module can be directly illuminated from the back side by the built-in fluorescent tube (cold cathode tube) 41. However, even when a diffuser (light-scattering film) is used, an uneven emission (luminance) distribution in the direction normal to the longitudinal axis of the fluorescent tube is inevitable, causing a streak pattern to appear, although the emission distribution in the longitudinal direction is uniform.

Furthermore, the device including a light guide can be constructed by using the backlight unit illustrated in FIG. 5 as the backlight system of the surface display device of FIG. 4. This backlight unit has a fluorescent tube (cold cathode tube) 51 and a reflector member 55 disposed in parallel with the fluorescent tube, with a light guide 54 having a diffuser 53 at top and a reflector 52 at bottom being disposed in the direction of light emission from the fluorescent tube. The lower part of the light guide 54 is inclined so that the light from the fluorescent tube can be reflected in an upward direction. The light emerging in the direction of the top of the light guide 54 is diffused by the diffuser 53 and incident on the surface display module (not shown) constructed (laminated) on the diffuser.

When such a backlight unit is used, in contrast to the backlight unit or component of FIG. 4, the emission distribution may appear uniform over the surface but a detailed observation of the emission distribution reveals that the distribution is still not as uniform as desired. Thus, as shown in FIGS. 6 and 7, the emission distribution (luminance distribution) in the longitudinal (axial) direction (x-direction) of the fluorescent tube (cold cathode tube) 51 is small as it is the case in the device of FIG. 4 but the emission from the fluorescent tube (cold cathode tube) in the y-direction which is normal to the x-direction is repeatedly reflected by the reflector 52 and advances in the z-direction (the direction in which the liquid crystal display module is disposed) which is perpendicular to the xy plane so that the emission distribution (luminance distribution) in the y-direction is distorted (in a zigzag pattern), thus failing to assure sufficient uniformity.

Thus, in the usual backlight type display device, the emission distribution (luminance distribution) in the direction normal to the longitudinal direction (X-direction) of the fluorescent tube is not uniform and a streak-like directionality (linear dark areas) is produced in the emission distribution. Moreover, even when a light-scattering film containing microfine particles is used, it is inevitable from its isotropy of light scattering that the luminance in a certain direction (the direction of disposition of the fluorescent tube, the streaking direction, X-direction) is unduly lowered.

Japanese Patent Application Laid-Open No. 142843/1999 (JP-A-11-142843) describes a technology such that a dot pattern for scattering light is formed in rows perpendicular to the light source on the surface of the light guide. However, even with this contrivance, linear dark areas (a streak pattern) are observed in the direction of disposition of the fluorescent tube.

Japanese Patent Application Laid-Open No. 261171/1995 (JP-A-7-261171) describes a reflection type liquid crystal display device comprising a pair of glass substrates, an electrode formed on each of the opposed surfaces of the glass substrates, a liquid crystal sealed interposed between the electrodes, and a polarizing film formed on (laminated) the outer surface of the external one of the pair of glass electrodes, with a light-scattering layer composed of two or more kinds of resins differing from each other in the index of refraction and forming mutually segregated (separated) phases being disposed on the surface of the polarizing film. In this literature, it is mentioned that the polarizing film is coated or printed with a mixture of two or more kinds of resins in a solvent to form the light-scattering layer.

Furthermore, as a reflection type liquid crystal display device (or a reflection type liquid crystal module), the device (or module) illustrated in FIG. 8 is also known. This reflection type display module comprises a pair of glass substrates 81a, 81b, a pair of electrodes 82a, 82b formed on the opposed surfaces of the glass substrates, and a liquid crystal 87 interposed between the electrodes forming the pair, the electrode 82a formed on the glass substrate 81a on the back side constituting light-reflective pixel electrodes and a color filer 84 being interposed between the glass substrate 81b on the front side and the electrode 82b. In addition, a phase difference layer 86 is constructed (laminated) through a polarizing layer 85 on the front surface of the glass substrate 81b on the front side. In this reflection type liquid crystal display module, a diffuser 83 is formed on the front surface (the front surface of the phase difference layer 86) to constitute a reflection type liquid crystal display device. Since, in the reflection type liquid crystal display device, one polarizing layer 85 is situated on the front side of the liquid crystal cell, unlike in the transmission type display device having a built-in lamp (the backlight type liquid crystal display device), the incident light which is incident on the front surface of the device (external light) is diffused by the diffuser 83 and enters into the liquid crystal cell and then is reflected by the reflective electrode (reflector) 82a within the liquid crystal cell and diffused by the diffuser 83. Therefore, the data or image displayed on the display module can be visually recognized from any angle without loss of luminance without the provision of a lamp (light) but utilizing external light.

In the reflection type liquid crystal display device, however, if the light diffusing power or ability of the diffuser is too great, the incident light and the reflected light are randomly reflected in a large measure by the diffuser so that the clarity of displayed data is sometimes sacrificed.

Meanwhile, Japanese Patent Application Laid-Open No. 314522/1992 (JP-A-4-314522) describes an anisotropic light-scattering material comprising a transparent matrix and a (particulate) transparent substance which is morphologically anisotropic and differing in the index of refraction from the transparent matrix as uniformly dispersed in the matrix in a positional relation shifted in an orderly and mutually parallel manner. In this literature, it is disclosed that the anisotropic light-scattering material such that the morphologically anisotropic transparent substance has a particle size of 0.5 to 70 μm and an aspect ratio of not less than 10, preferably 15 to 30, is of value as a lenticular lens for the projection television screen. There, a light-scattering film featuring the aspect ratio of about 10 to 25 with a minor axis dimension of about 1 to 2 μm is manufactured by a method which comprises kneading a low-melting low-density polyethylene for the transparent matrix resin with a polystyrene or a styrene-acrylonitrile copolymer for the (particulate) transparent substance, extruding the resulting resin composition, and cooling the molten resin extruded in the form of a sheet under a large draft applied in the direction of extrusion.

However, even when this anisotropic light-scattering material is applied to the backlight type display device, the uniformity of emission distribution is still inadequate. Moreover, this anisotropic light-scattering material is inadequate in heat resistance as well.

SUMMARY OF THE INVENTION

The present invention has for its object to provide an anisotropic light-scattering film assuring a uniform surface emission with close tolerances and without compromise in luminance, a method of producing the same, and a display device (particularly a liquid crystal display device) utilizing the film.

It is another object of the present invention to provide an anisotropic light-scattering film giving a uniform surface emission easily even if the light from a light source has an anisotropy of emission distribution (distribution of luminance), a method of producing the same and a display device (particularly a liquid crystal display device) utilizing the film.

It is still another object of the present invention to provide an anisotropic light-scattering film having a good anisotropy of light scattering despite its high transparency, a method of producing the same, and a display device (particularly a transmission type liquid crystal display device) utilizing the film.

It is another yet object of the present invention to provide a reflection type liquid crystal display device which upholds the clarity of displayed data and has a strong display directionality.

It is a further object of the present invention to provide a lenticular lens having a good anisotropy of light scattering as well as high heat resistance.

The inventors of the present invention did much research to accomplish the above objects and found that, in a liquid crystal display device equipped with a light projectors having an anisotropy (directionality) of emission distribution and a light diffusing film, the ratio of the light scattering characteristic $Fx(\theta)$ in one direction of the film and the light scattering characteristic $Fy(\theta)$ in the direction normal thereto over the range of scattering angle $\theta=4$ to $30°$ is a major factor in the uniformization of the luminance distribution of emerging light and that when the relation of $Fy(\theta)/Fx(\theta)>5$ holds over the range of scattering angle $\theta=4$ to $30°$, the luminance distribution can be uniformized without compromise in the luminance of the image displayed. The present invention has been developed on the basis of the above findings.

Thus, the anisotropic light-scattering film of the present invention is capable of scattering an incident light in the direction of advance of the light and, in the scattering characteristic $F(\theta)$ relevant to the relation between the scattering angle $\theta$ and the intensity of scattered light F, satisfies the following relation over the range of $\theta=4$ to $30°$.

$$Fy(\theta)/Fx(\theta)>5$$

where $Fx(\theta)$ represents the scattering characteristic in the direction of the X-axis of the film and $Fy(\theta)$ represents the scattering characteristic in the direction of the Y-axis of the film.

This film can be comprised of a continuous phase and a particulate discontinuous phase (dispersed phase or dispersoid) which differ from each other in the index of refraction by not less than 0.001 and is characterized in that the mean aspect ratio of dispersed phase (dispersoid) particles is greater than 1 (for example about 5 to 500) and that the major axes of dispersed phase particles are oriented usually in the direction of the X-axis of the film. The mean dimension of the minor axes of dispersed phase particles may for example be about 0.1 to 10 μm. Since, with such a film, light can be diffused with high anisotropy, the emission distribution can be uniformized without compromise in luminance even when a light projector means having an anisotropy of emission distribution (e.g. a tubular light projector) is used in conjunction.

As the resins for constituting the continuous phase and dispersed phase, transparent resins can be employed. For example, the continuous phase may be formed by using a crystalline olefin resin (e.g. a polypropylene-series resin), while the dispersed phase may be composed of a noncrystalline polyester-series resin. This anisotropic light-scattering film may further contain a compatibilizing agent (e.g. an epoxidized diene-series block copolymer). The relative amount of the continuous phase and dispersed phase may for example be [former/latter]=about 99/1 to 50/50 (weight ratio) and the relative amount of the dispersed phase and compatibilizing agent may for example be [former/latter]=about 99/1 to 50/50 (weight ratio). The film may be formed with surface irregularities extending in the direction of its X-axis.

The above film can be produced by melt-blending and extruding the continuous-phase resin and dispersed phase resin and carrying out an orientation treatment for orienting the dispersed phase. The orientation treatment includes a method of producing a film under constant application of a draft and a method in which the solidified film is monoaxially stretched (e.g. using a calender roll). This orientation treatment (for example, the stretching) may be carried out at a temperature beyond the melting point or glass transition point of the dispersed phase-forming resin.

The present invention further encompasses a display device comprising a display module, a tubular light projector means for projecting light toward the module, and the anisotropic light-scattering film as disposed forwardly of the projector means. The light-scattering film is disposed with its X-axis aligned with the longitudinal direction of the projector means. Furthermore, the present invention may be embodied as a reflection type liquid crystal display device including the light-scattering film or as a lenticular lens for projection television which is constituted by the light-scattering film.

Throughout this specification, the term "film" is used without regard to thickness, thus meaning a sheet as well.

BRIEF DESCRIPTION OF THE DRAWINGS

FIG. 1 is a schematic cross-section view showing the method for measurement of scattered light intensity.

DETAILED DESCRIPTION OF THE INVENTION

Figure 2:
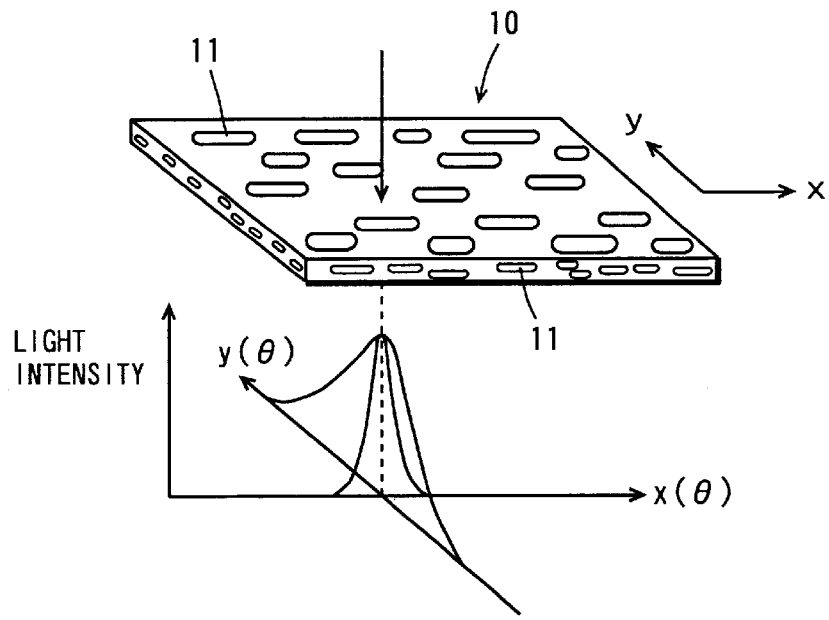
FIG. 2 is a conceptual view illustrating the anisotropy of light scattering of the film of the invention.

The anisotropic light-scattering film of the present invention is capable of scattering incident light principally in the direction of advance thereof and has an anisotropy of light scattering as defined below. Thus, in terms of the scattering characteristic $F(\theta)$ relevant to the relation between the scattering angle $\theta$ and the intensity of scattered light F, the film satisfies the following relation (1), preferably relation (2)

$$F1 = Fy(\theta)/Fx(\theta) > 5 \quad (\theta = 4 \text{ to } 30°) \quad (1)$$

$$F2 = Fy(\theta)/Fx(\theta) > 10 \quad (\theta = 2 \text{ to } 30°) \quad (2)$$

where $Fx(\theta)$ represents the scattering characteristic in the direction of the X-axis (the longitudinal direction or the take-up direction) of the film and $Fy(\theta)$ represents the scattering characteristic in the direction of the Y-axis normal to the X-axis.

The value of $F1 = Fy(\theta)/Fx(\theta)$ is usually about 10 to 500, preferably about 15 to 500, more preferably about 50 to 500 (e.g. 100 to 400), and such values apply not only to a scattering angle $\theta$ range of 4 to 30° but also to a scattering angle $\theta$ range=4 to 15°. The value of $F2 = Fy(\theta)/Fx(\theta)$ is usually about 15 to 500, preferably about 20 to 500 (e.g. 20 to 400), and such values apply not only to a scattering angle $\theta$ range of 4 to 30° but also to a scattering angle $\theta$ range of 4 to 15°.

Incidentally, assuming that the light scattering characteristic (intensity) against the scattering angle $\theta$ on a plane perpendicular to the major axes of dispersed phase particles is $Fy(\theta)$ and the light scattering characteristic (intensity) against the scattering angle $\theta$ on a plane parallel to the major axes of dispersed phase particles is $Fx(\theta)$, the ratio of $Fy(\theta)$ to $Fx(\theta)$, that it to say the value of $(Fy(\theta)/Fx(\theta))$, at the scattering angle $\theta=4°$ in the light-scattering film described in Japanese Patent Application Laid-Open No. 314522/1992 (JP-A-4-314522) is approximately equal to 2.

If the anisotropy coefficient F1 expressed by $Fy(\theta)/Fx(\theta)$ is less than 5, no uniform surface emission can be obtained when the film is applied to a liquid crystal display device having a tubular projector means (light source).

When the scattering characteristic in the $\psi$ direction which is intermediate between the X-axis and Y-axis directions is written as $F\psi(\theta)$ (where $\psi$ represents the angle made with the X-axis direction; the X-axis direction corresponds to $\psi=0°$ and the Y-axis direction corresponds to $\psi=90°$), the anisotropic light-scattering film of the present invention need not necessarily have an anisotropy insuring that $F\psi(\theta)$ ($\psi \neq 90°$) will be approximately equal to $Fx(\theta)$, but preferably $F\psi(\theta)$ ($\psi \neq 90°$) is close to $Fx(\theta)$. Such a film is capable of scattering light with high anisotropy.

The scattering characteristic $F(\theta)$ can be measured using an instrument shown in FIG. 1. This instrument comprises a laser irradiating unit (Nihon Kogaku Eng., NEO-20MS) 21 for projecting a laser light to the anisotropic light-scattering film 10 and a detector 22 for quantitating the intensity of the laser light transmitted through the anisotropic light-scattering film 10. The laser light is emitted at an angle of 90° with respect to the anisotropic light-scattering film 10 and the intensity of light diffused by the film (diffusion intensity) F is plotted against the diffusing angle θ, whereby the light-scattering characteristic can be determined.

Figure 4:
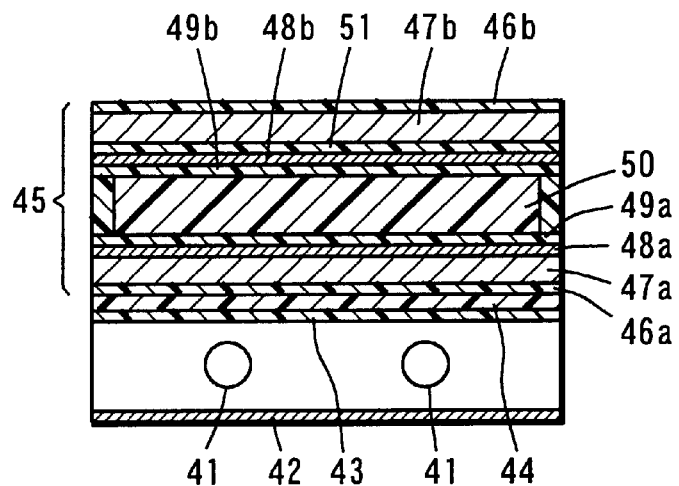
FIG. 4 is a shematic cross-section view of a transmission type liquid crystal display device.

When such an anisotropic light-scattering film is used as, for example, the light-scattering film of the backlight unit illustrated in FIG. 4, the nonuniform (zigzag) emission distribution (luminance distribution) in the direction normal to the longitudinal axis of the fluorescent tube (Y-axis direction) can be uniformized so that the generation of linear dark areas can be prevented.

The film having such a high degree of scattering anisotropy can be obtained by using a continuous phase (e.g. a continuous resin phase) and a particulate dispersed phase (e.g. a dispersed resin phase or a dispersed fiber phase) which are mutually incompatible or hardly compatible.

The resin which can be used for constituting the light-scattering film includes thermoplastic resins (olefinic resin, halogen-containing resin, vinyl alcohol-series resin, vinyl ester-series resin, (meth)acrylic resin, styrenic resin, polyester-series resin, polyamide-series resin, polycarbonate-series resin, cellulose derivatives, etc.) and thermosetting resins (epoxy resin, unsaturated polyester resin, diallyl phthalate resin, silicone resin, etc.). The preferred resins are the thermoplastic resins.

The olefinic resin includes but is not limited to homo- or copolymers of $C_{2-6}$ olefins (ethylenic resins such as polyethylene, ethylene-propylene copolymer, etc., polypropylene-series resins such as polypropylene, propylene-ethylene copolymer, propylene-butene copolymer, etc., poly(methylpentene-1), propylene-methylpentene copolymer, etc.), and copolymers of $C_{2-6}$ olefins with copolymerizable monomers (ethylene-(meth)acrylic acid copolymer, ethylene-(meth)acrylate copolymer, etc.).

The halogen-containing resin includes but is not limited to vinyl halide resins (e.g. homopolymers of vinyl chloride or fluorine-containing monomers, such as polyvinyl chloride, polytetrafluoroethylene, polychlorotrifluoroethylene, poly(vinyl fluoride), etc., copolymers of vinyl chloride or fluorine-containing monomers, such as tetrafluoroethylene-hexafluoropropylene copolymer, tetrafluoroethylene-perfluoroalkyl vinyl ether copolymers, etc.; and copolymers of vinyl chloride or fluorine-containing monomers with other copolymerizable monomers, such as vinyl chloride-vinyl acetate copolymer, vinyl chloride-(meth)acrylate copolymer, tetrafluoro-ethylene-ethylene copolymer, etc.), and vinylidene halide-series resins (poly(vinylidene chloride), poly(vinylidene fluoride), copolymers of vinylidene chloride or fluorine-containing vinylidene monomers with other monomers).

The derivative of vinyl alcohol-series resin includes polyvinyl alcohol, ethylene-vinyl alcohol copolymers, etc. The vinyl ester-series resin includes homo- or copolymers of vinyl ester-series monomers (e.g. polyvinyl acetate), copolymers of vinyl ester-series monomers with copolymerizable monomers (e.g. vinyl acetate-ethylene copolymer, vinyl acetate-vinyl chloride copolymer, vinyl acetate-(meth)acrylate copolymer, etc.).

The (meth)acrylic resin includes but is not limited to poly(meth)acrylates such as polymethyl(meth)acrylate, methyl methacrylate-(meth)acrylic acid copolymer, methyl methacrylate-(meth)acrylate-(meth)acrylic acid copolymers, methyl methacrylate-(meth)acrylate copolymers, and (meth)acrylate-styrene copolymers (MS resin). The preferred (meth)acrylic resin includes poly($C_{1-5}$ alkyl (meth)acrylate) and methyl methacrylate-acrylate copolymers.

The styrenic resin includes homo- or copolymers of styrenic monomers (e.g. polystyrene, styrene-α-methylstyrene copolymer, etc.) and copolymers of styrenic monomers with copolymerizable monomers (e.g. styrene-acrylonitrile copolymer (AS resin), styrene-(meth)acrylic ester copolymers, styrene-maleic acid copolymer, etc.).

The polyester-series resin includes aromatic polyesters obtainable from an aromatic dicarboxylic acid, such as terephthalic acid, and an alkylene glycol (homopolyesters, e.g. polyalkylene terephthalates such as polyethylene terephthalate, polypropylene terephthalate, polybutylene terephthalate, etc. and polyalkylene naphthalates such as polyethylene naphthalate, polybutylene naphthalate, etc.; and copolyesters containing an alkylene arylate unit as a main component (e.g. not less than 50 mole %, preferably 75 to 100 mole %, more preferably 80 to 100 mole %)), aliphatic polyesters obtainable by using aliphatic dicarboxylic acids such as adipic acid, and liquid-crystalline polyesters.

The polyamide resin includes aliphatic polyamides such as nylon 46, nylon 6, nylon 66, nylon 610, nylon 612, nylon 11, nylon 12, etc. and aromatic polyamides such as xylylenediamine adipate (MXD-6), among others. The polyamide resin is not restricted to homopolyamides but may be copolyamides.

The polycarbonate-series resin includes aromatic polycarbonates based on bisphenols (e.g. bisphenol A) and aliphatic polycarbonates such as diethylene glycol bis-aryl carbonates.

The cellulose derivative includes cellulose esters (e.g. cellulose acetate, cellulose propionate, cellulose butyrate, cellulose phthalate, etc.), cellulose carbamates (e.g. cellulose phenylcarbamate), cellulose ethers (e.g. alkylcelluloses, benzylcellulose, hydroxyalkylcelluloses, carboxymethylcellulose, cyanoethylcellulose, etc.).

Where necessary, the resin component may have been modified (e.g. rubber-modified).

It is also possible to form a continuous phase matrix from the resin component and graft- or block-copolymerize the dispersed phase component with this matrix resin. As examples of such polymer, there can be mentioned rubber-block copolymers (e.g. styrene-butadiene copolymer (SB resin)) and rubber-grafted styrenic resins (e.g. acrylonitrile-butadiene-styrene copolymer (ABS resin)).

The fibrous dispersed phase includes organic fiber and inorganic fiber. The organic fiber includes heat-resistant organic fibers such as aramid fiber, all-aromatic polyester fiber, polyimide fiber, etc.

The inorganic fiber includes but is not limited to fibrous fillers (e.g. inorganic fibers such as glass fiber, silica fiber, alumina fiber, zirconia fiber, etc.) and flaky fillers (e.g. mica etc.).

The preferred component for making up the continuous phase or the dispersed phase (discontinuous phase or dispersed phase) includes olefinic resin, (meth)acrylic resin, styrenic resin, polyester-series resin, polyamide-series resin and polycarbonate-series resin, among others. Moreover, the resin constituting the continuous phase and/or dispersed phase may be crystalline or noncrystalline, and the continuous phase and dispersed phase may be formed using noncrystalline resins. In the preferred embodiment, a crystalline resin and a noncrystalline resin can be used in combination. Thus, either one (for example, the continuous phase) of the continuous phase and dispersed phase (discontinuous phase) may be made of a crystalline resin and the other one: (for example, dispersed phase) of the phases be made of a noncrystalline resin.

The crystalline resin which can be used includes olefinic resins (polypropylene-series resin with a propylene content of not less than 90 mole %, such as polypropylene, propylene-ethylene copolymer, etc., poly(methylpentene-1), etc.), vinylidene-series resins (e.g. vinylidene chloride-series resin), aromatic polyester-series resins (e.g. polyalkylene arylate homopolyesters such as polyalkylene terephthalates, polyalkylene naphthalates, etc., copolyesters containing not less than 80 mole % of an alkylene arylate unit, liquid-crystalline aromatic polyesters, etc.), and polyamide-series resins (e.g. aliphatic polyamides having short-chain segments, such as nylon 46, nylon 6, nylon 66, etc.). These crystalline resins can be used independently or in a combination of two or more species.

The degree of crystallization of the crystalline resin (e.g. crystalline polypropylene resin) may for example be about 10 to 80%, preferably about 20 to 70%, more preferably about 30 to 60%.

As the resin constituting the continuous phase, usually a highly transparent resin is used. The particularly preferred continuous phase-forming resin is a crystalline resin having high fluidity. The combination use of such a resin and the dispersed phase-forming resin contributes to an improved homogeneity of the compound (uniform dispersability of the dispersed phase).

The resin constituting the continuous phase may be a resin having a melting point or glass transition temperature of about 130 to 280° C., preferably about 140 to 270° C., more preferably about 150 to 260° C.

The noncrystalline resin which can be used includes but is not limited to vinyl-series polymers (homo- or copolymers of vinyl-series monomers such as ionomers, ethylene-vinyl acetate copolymer, ethylene-(meth)acrylic ester copolymers, polyvinyl chloride, vinyl chloride-vinyl acetate copolymer, poly(vinyl acetate), vinyl alcohol resin, etc.), (meth)acrylic resins (e.g. poly(methyl methacrylate), methyl methacrylate-styrene copolymer (MS resin), etc.), styrenic resins (polystyrene, AS resin, etc.), polycarbonate-series polymers noncrystalline polyester-series resins (aliphatic polyesters, polyalkylene acrylate copolyesters whose diol component and/or aromatic dicarboxylic acid component has been partially substituted, polyarylate resins, etc.), polyamide resins (e.g. aliphatic polyamides having long-chain segments and noncrystalline aromatic polyamides), and thermoplastic elastomers (e.g. polyester elastomers, polyolefin elastomers, polyamide elastomers, styrenic elastomers, etc.). Referring to the noncrystalline polyester resins, the polyalkylene arylate copolyester includes copolyesters obtainable by using at least one member selected from among (poly)oxyalkylene glycol, e.g. diethylene glycol, triethylene glycol, etc., cyclohexanedimethanol, phthalic acid, isophthalic acid and aliphatic dicarboxylic acids (e.g. adipic acid) as part (e.g. about 10 to 80 mole %, preferably about 20 to 80 mole %, more preferably about 30 to 75 mole %) of the diol component ($C_{2-4}$alkylene glycol) and/or aromatic dicarboxylic acid component (terephthalic acid, naphthalenedicarboxylic acid). These noncrystalline resins can be used independently or in a combination of two or more species.

As the resin constituting the dispersed phase, usually a highly transparent resin is employed. The melting point or glass transition point of the dispersed phase-forming resin is lower than that of the resin constituting the continuous phase in many instances, and may for example be about 50 to 180° C., preferably about 60 to 170° C., more preferably about 70 to 150° C.

The combination of the crystalline resin forming the continuous phase with the noncrystalline resin forming the dispersed phase includes but is not limited to the combination of a crystalline polyolefinic resin (e.g. crystalline polypropylene resin) with a noncrystalline polyester (e.g. polyalkylene arylate copolyesters such as polyalkylene terephthalate copolyesters).

When a resin having a high melting point or glass transition point (particularly a high-melting crystalline resin) is used as the continuous phase-forming resin, its high heat stability and good film-forming properties allow the orientation treatment (or monoaxial stretching) to be carried out easily at a comparatively high temperature (e.g. about 130 to 150° C.) to consummate the necessary orientation of the dispersed phase. Furthermore, the film is stable over a broad temperature range (e.g. room temperature to about 80° C.) so that it can be utilized as a component part of a display device (liquid crystalline display device) with advantage. In addition, crystalline resins (e.g. crystalline polypropylene resin) are generally inexpensive. On the other hand, when a resin having a lower melting point or glass transition point than the continuous-phase resin (particularly a noncrystalline resin having a lower melting point or glass transition point) is used as the resin constituting the dispersed phase, the aspect ratio of dispersed phase particles can be easily increased by an orientation treatment such as monoaxial stretching. For example, when a noncrystalline copolyester is used to form the dispersed phase, not only a high degree of transparency can be assured but the glass transition temperature can be reduced (e.g. about 80° C.) so that a deformation can be readily introduced to the dispersed phase at the temperature used for orientation treatment such as monoaxial stretching and the dispersed phase can be kept stable over a given temperature range (for example, room temperature to about 80° C.) after molding. Moreover, a noncrystalline copolyester (e.g. a polyethylene terephthalate copolyester obtainable by using a diol component such as ethylene glycol/cyclohexanedimethanol=ca 10/90 to 60/40 (mole %), preferably ca 25/75 to 50/50 (mole %)) has a high index of refraction (e.g. about 1.57) so that the refractive index differential from the continuous phase can be increased.

In the present invention, the continuous phase and discontinuous phase (dispersed phase or dispersoid) are constituted of components differing from each other in the index of refraction. By using components differing in the index of refraction, the film can be provided with light-diffusing properties. The refractive index differential between the continuous phase and the discontinuous phase may for example be not less than 0.001 (e.g. about 0.001 to 0.3), preferably about 0.01 to 0.3, more preferably about 0.01 to 0.1.

As the combination of resins giving such a defined refractive index differential, the following combinations may be mentioned by way of example.

The combination of resins giving such a defined refraction index difference includes but is not limited to the following combinations.

(1) The combination of an olefinic resin (particularly a propylene-series resin) with at least one member selected from the group consisting of an acrylic resin, a styrenic resin, a polyester-series resin, a polyamide-series resin and a polycarbonate-series resin.

(2) The combination of a styrenic resin with at least one member selected from the group consisting of a polyester-series resin, a polyamide-series resin and a polycarbonate-series resin.

(3) The combination of a polyester-series resin with at least one member selected from the group consisting of a polyamide-series resin and a polycarbonate-series resin.

The light-scattering film may contain a compatibilizing agent where necessary. With a compatibilizing agent, the miscibility and mutual affinity of the continuous and dispersed (discontinuous) phases can be improved, the formation of defects (voids and other defects) on orientation of the film can be prevented, and the loss of transparency of the film can be prevented. Furthermore, the adhesion between the continuous phase and the dispersed phase can be enhanced so that even when the film is stretched monoaxially, the adhesion of the dispersed phase on the stretching equipment can be decreased.

The compatibilizing agent can be selected from among the conventional compatibilizing agents according to the species of continuous and dispersed phase resins and, for example, modified resins as modified with oxazoline compounds or modifying groups (carboxyl, acid anhydride, epoxy, oxazolinyl and other groups), diene-series copolymers (random and other copolymers) obtainable by copolymerization with diene or rubber-containing polymers [e.g. homo- or copolymers of diene monomers or copolymerizable monomers (aromatic vinyl monomers etc.); diene graft copolymers such as acrylonitrile-butadiene-styrene copolymer (ABS resin); diene block copolymers such as styrene-butadiene (SB) block copolymer, hydrogenated styrene-butadiene (SB) block copolymer, hydrogenated styrene-butadiene-styrene block copolymer (SEBS), hydrogenated (styrene-ethylene/butylene-styrene) block copolymer, etc. and their hydrogenation versions etc.], and diene or rubber-containing polymers modified with the modifying groups (epoxy and other groups). These compatibilizing agents can be used independently or in a combination of two or more species.

As the compatibilizing agent, a polymer (a random, block or graft copolymer) having the same components as, or components in common with, the polymer blend constituent resins or polymers (random, block or graft copolymers) having an affinity for the polymer blend constituent resins.

The diene-series monomer includes conjugated dienes such as $C_{4-20}$ conjugated dienes which may optionally be substituted, e.g. butadiene, isoprene, 1,3-pentadiene, 2,3-dimethyl-1,3-butadiene, piperylene, 3-butyl-1,3-octadiene, phenyl-1,3-butadiene, etc. The conjugated dienes can be used independently or in a combination of two or more species. Among these conjugated dienes, butadiene and isoprene are preferred.

The aromatic vinyl monomer includes but is not limited to styrene, α-methylstyrene, vinyltoluene (p-methylstyrene etc.), p-t-butylstyrene, divinylbenzenes and 1,1-diphenylstyrene. Among these aromatic vinyl monomers, styrene is preferred. The (meth)acrylic monomer includes alkyl (meth)acrylates (e.g. methyl (meth)acrylate) and (meth)acrylonitrile, among others. As the maleimide monomer, maleimide, N-alkylmaleimides, N-phenylmaleimide, etc. can be mentioned. These monomers can be used independently or in a suitable combination of two or more species.

The modification mentioned above can be made by copolymerizing a monomer corresponding to the modifying group (e.g. a carboxyl group-containing monomer such as (meth)acrylic acid for carboxyl-modification, maleic anhydride for acid anhydride-modification, a (meth)acrylic monomer for ester-modification, a maleimide monomer for maleimide-modification, and an epoxy group-containing monomer such as glycidyl (meth)acrylate for epoxy-modification). The epoxy-modification may be made by epoxidization of an unsaturated double bond.

The preferred compatibilizing agent is an unmodified or modified diene copolymer, particularly a modified block copolymer (e.g. an epoxidized diene block copolymer or an epoxy-modified diene block copolymer). The epoxidized diene block copolymer is not only highly transparent but has a high softening point and is capable of compatibilizing resins in many combinations of continuous and dispersed phases and dispersing the dispersoid (dispersed phase) uniformly.

The block copolymer mentioned above can be constituted of a conjugated diene block or the corresponding partially hydrogenated block and an aromatic vinyl block. In the epoxidized diene block copolymer, the double bonds in the conjugated diene blocks may have been partly or completely epoxidized.

The ratio (weight ratio) of the aromatic vinyl block to the conjugated diene block (or the corresponding hydrogenated block) may for example be [former/latter]=about 5/95 to 80/20 (e.g. about 25/75 to 80/20), more preferably about 10/90 to 70/30 (e.g. about 30/70 to 70/30), and usually about 50/50 to 80/20.

The number average molecular weight of the block copolymer can be selected from the range of, for example, about 5,000 to 1,000,000, preferably about 7,000 to 900,000, still more preferably about 10,000 to 800,000. The molecular weight distribution [the ratio [Mw/Mn] of weight average molecular weight (Mw) to number average molecular weight (Mn)] may for example be not more than 10 (about 1 to 10), preferably about 1 to 5.

The molecular structure of the block copolymer may be linear, branched, radial or any combination thereof. The block structure of the block copolymer may for example be a monoblock structure, a multiblock structure such as a tereblock structure, a trichain-radial tereblock structure or tetrachain-radial tereblock structure. Such block structures may for example be written as X-Y, X-Y-X, Y-X-Y, Y-X-Y-X, X-Y-X-Y, X-Y-X-Y-X, Y-X-Y-X-Y, $(X-Y-)_4Si$, $(Y-X-)_4Si$, etc. where X represents an aromatic diene block and Y represents a conjugated diene block.

The ratio of epoxy groups in the epoxidized diene-series block copolymer is not particularly restricted but, in terms of oxygen concentration of oxirane, may for example be about 0.1 to 8 weight %, preferably about 0.5 to 6 weight %, more preferably about 1 to 5 weight %. The epoxy equivalent (JIS K7236) of the epoxidized block copolymer may for example be about 300 to 1000, preferably about 500 to 900, more preferably about 600 to 800.

The epoxidized block copolymer (e.g. epoxidized SBS block copolymer) making up the compatibilizing agent is not only highly transparent but also has a comparatively high softening point (about 70° C.) and is capable of effectively compatibilizing resins in many combinations of continuous and dispersed phases and dispersing the dispersoid (dispersed phase) resin uniformly. Moreover, the epoxidized block copolymer with an aromatic vinyl block (e.g. styrene block) content of about 60 to 80 weight % has a refractive index which is comparatively high (e.g. about 1.57) and close to the refractive index of the dispersoid resin (e.g. noncrystalline copolyester) so that the dispersoid resin can be caused to be uniformly dispersed while the light scattering performance of the dispersoid resin is maintained.

The refractive index of the compatibilizing agent (e.g. epoxidized block cpolymer) may be approximately the same as that of the dispetsoid resin (for example, the difference from the refractive index of dispersoid resin is about 0 to 0.01, preferably about 0 to 0.005).

The epoxidized block copolymer mentioned above can be produced by epoxidizing a diene-series block copolymer (or a partially hydrogenated block copolymer) which has been prepared by the conventional method. The block copolymer can for example be prepared by polymerizing an aromatic vinyl monomer with a diene-series monomer in the presence of a lithium catalyst in an inert solvent [Japanese Patent Publication No. 23798/1965 (JP-B-40-23798), Japanese Patent Publication No. 3252/1972 (JP-B-47-3252), Japanese Patent Publication No. 2423/1973 (JP-B-48-2423), Japanese Patent Application Laid-Open No. 33184/1976 (JP-A-51-33184), Japanese Patent Publication No. 32415/1971 (JP-B-46-32415), Japanese Patent Application Laid-Open No. 166518/1984 (JP-A-59-166518), Japanese Patent Publication No. 36957/1974 (JP-B-49-36957), Japanese Patent Publication No. 1.7979/1968 (JP-B-43-17979), Japanese Patent Publication No. 32415/1971 (JP-B-46-32415), Japanese Patent Publication No. 28925/1981 (JP-B-56-28925), etc.]. The hydrogenated block copolymer may for example be prepared by hydrogenating a block copolymer with the aid of a hydrogenation catalyst in an inert solvent [Japanese Patent Publication No. 8704/1967 (JP-B-42-8704), Japanese Patent Publication No. 6636/1968 (JP-B-43-6636), Japanese Patent Application Laid-Open No. 133203/1984 (JP-A-59-133203), etc.].

The epoxidization can be carried out in accordance with the conventional epoxidizing method, for example by epoxidizing the above-mentioned block copolymer with an epoxidizing agent (e.g. a peracid, a hydroperoxide, etc.) in an inert solvent. The peracid mentioned just above includes performic acid, peracetic acid, trifluoroperacetic acid, perbenzoic acid, etc. The hydroperoxide includes inorganic hydroperoxides (e.g. hydrogen peroxide) and organic hydroperoxides (e.g. t-butyl hydroperoxide). The hydroperoxide is used in combination with an acid or a metal catalyst in many cases, and the combination of tungstic acid-sodium hydroxide mixture with hydrogen peroxide, the combination of an organic acid with hydrogen peroxide, and the combination of molybdenum hexacarbonyl with t-butyl hydroperoxide can be mentioned as examples. The level of use of the epoxidizing agent is not particularly restricted but can be broadly and judiciously selected according to the kind of block copolymer, the kind of epoxidizing agent, and expected degree of epoxidization (e.g. epoxy equivalent).

The isolation and purification of the epoxidized diene-series block copolymer can be carried out by a suitable method, for example the method which comprises precipitating the copolymer with a poor solvent, the method which comprises adding the copolymer to hot water under stirring and removing the solvent by distillation, or the direct desolventization method (direct desolvation method).

The amount (level) of use of the compatibilizing agent may be selected from the range of, for example, about 0.1 to 20 weight %, preferably about 0.5 to 15 weight %, more preferably about 1 to 10 weight %, based on the total resin composition.

In the light-scattering film, the preferred combination of continuous phase, dispersed phase and compatibilizing agent includes the combination of a continuous phase composed of a resin having high transparency and high thermal stability (e.g. a crystalline resin such as a crystalline polypropylene-series resin), a dispersed phase composed of a resin having high transparency, good thermal deformability and a fair degree of thermal stability (e.g. a noncrystalline resin such as a noncrystalline (amorphous) copolyester) and a compatibilizing agent comprising an epoxidized block copolymer.

In the light-scattering film, the ratio of the continuous phase to the dispersed phase can be judiciously selected from the range of, for example, [former/latter (by weight)]= about 99/1 to 30/70, preferably about 99/1 to 50/50, more preferably about 99/1 to 75/25, with reference to the kinds, melt viscosity and light diffusing properties of the resins.

In the preferred light-scattering film, the relative amount of the continuous phase, dispersed phase and compatibilizing agent may for example be as follows.

(1) continuous phase/dispersed phase (weight ratio)=about 99/1 to 50/50, preferably about 98/2 to 60/40, more preferably about 90/10 to 60/40, particularly about 80/20 to 60/40.

(2) dispersed phase/compatibilizing agent (weight ratio)= about 99/1 to 50/50, preferably about 99/1 to 70/30, more preferably about 98/2 to 80/20.

When the components are used in such ratios, the dispersoid component can be uniformly dispersed even if the components are not respectively compounded in advance but pellets of the components are directly melt-kneaded together, with the result that the formation of voids on orientation treatment, e.g. monoaxial stretching, can be avoided and a light-scattering film of high transmittance can be obtained.

In the light-scattering film of the present invention, particles forming the dispersed phase are each so configured that the ratio of the mean dimension L of the major axis to the mean dimension W of the minor axis (mean aspect ratio, L/W) is larger than 1 and the direction of the major axis of each particle coincides with the x-axis of the film. The preferred mean aspect ratio (L/W) may for example be about 2 to 1000, preferably about 5 to 1000, more preferably about 5 to 500 (e.g. 20 to 500), and usually about 50 to 500 (particularly 70 to 300). The morphology of dispersed phase particles may for example be a football-like (e.g. spheroidal), filamentous or cuboid. The larger the aspect ratio is, the higher is the anisotropy expressed in the scattering of light.

The mean dimension L of the major axis of the dispersed phase particle may for example be about 0.1 to 200 $\mu$m (e.g. about 1 to 100 $\mu$m), preferably about 1 to 150 $\mu$m (e.g. about 1 to 80 $\mu$m), particularly about 2 to 100 $\mu$m (e.g. about 2 to 50 $\mu$m), usually about 10 to 100 $\mu$m (e.g. 10 to 50 $\mu$m). The mean dimension W of the minor axis of the dispersed phase particle may for example be about 0.1 to 10 $\mu$m, preferably about 0.15 to 5 $\mu$m, more preferably about 0.2 to 2 $\mu$m.

The orientation coefficient of dispersed phase particles may for example be not less than 0.7 (e.g. about 0.7 to 1), preferably about 0.8 to 1, more preferably about 0.9 to 1. The higher the orientation coefficient is, the higher is the anisotropy imparted to scattered light.

The orientation coefficient can be calculated by means of the following equation.

$$\text{Orientation coefficient} = (3 \langle \cos^2\theta \rangle - 1)/2$$

where $\theta$ represents the angle between the major axis of the particulate dispersed phase and the X-axis of the film or sheet (when the major axis is parallel to the X-axis, $\theta=0°$); $\langle \cos^2\theta \rangle$ represents the average of $\cos^2\theta$ values found for individual dispersed phase particles and can be expressed as follows.

$$\langle \cos^2\theta \rangle = \int n(\theta) \cdot \cos^2\theta \cdot d\theta$$

(wherein $n(\theta)$ represents the percentage (weight percent) of dispersed phase particles having the angle $\theta$ in the total population of dispersed phase particles.)

Such dispersed phase particles are capable of imparting high anisotropy to the light scattered through the film. Thus, the transmission light or reflection light can be strongly scattered by the film in the direction perpendicular to the direction of the major axis of the dispersed phase particle. FIG. 2 is a diagram (or conceptual view) illustrating the relationship of the orientation of such a dispersed phase particle to the anisotropy of scattered light. In the diagram, the major axis of the dispersed phase particle 11 in the light-scattering film 10 is shown as oriented in the direction of the X-axis of the film. Whereas the degree of scattering of incident light is small in the direction of the major axis of the particulate dispersed phase 11 (X-axis direction), the degree of scattering is large in the direction normal to the major axis (Y-axis direction). Therefore, the light scattering characteristics $Fx(\theta)$ and $Fy(\theta)$ hold the relation of $Fy(\theta) > Fx(\theta)$.

Where necessary, the light-scattering film of the present invention may be provided with directionality of the diffused light. That a film has directionality means that, among the angles of intense scattering in anisotropic diffusion, there is an angle giving a maximum scattering intensity when the diffused light has directionality. Referring to the measuring system depicted in FIG. 1, when the diffused light intensity F is plotted against the diffusion angle $\theta$, the curve of plots has a maximum or a shoulder (especially a maximum) within a given range of diffusion angle $\theta$ (but not at $\theta=0$) when the diffused light has directionality.

For imparting the directionality, the refractive index differential between the continuous phase matrix resin and the particulate dispersed phase may for example be about 0.005 to 0.2, preferably about 0.01 to 0.1, and the mean dimension of the major axes of particles may for example be about 1 to 100 μm, preferably about 5 to 50 μm. The aspect ratio may for example be about 20 to 300 (e.g. 40 to 300), preferably about 50 to 200.

The light-scattering film may contain the conventional additives, for example stabilizers such as an antioxidant, an ultraviolet absorber, a heat stabilizer, etc.; a plasticizer, an antistatic agent, a flame retardant and a filler.

The thickness of the light-scattering film is about 3 to 300 μm, preferably about 5 to 200 μm, more preferably about 5 to 100 μm. If the film is too thick, assembling the film into a display device results in an unduly increased thickness of the device. If the film is too thin, flexing or curling tends to take place to detract from the ease of handling.

The total light transmittance of the light-scattering film may for example be not less than 85% (85 to 100%), preferably about 90 to 100%, more preferably about 90 to 95%. If the total light transmittance is less than 85%, the reduction in luminance due to scattering will be so influential that the brightness of the display screen will become insufficient.

Optionally, the film may be formed with surface irregularities extending along its X-axis. When such surface irregularities are provided, a higher degree of anisotropy can be imparted to the film.

The light-scattering film can be obtained by dispersing and orienting a dispersed phase-forming component (resin component, fibrous component, etc.) in a continuous phase-forming resin. For example, the dispersoid component can be dispersed by the method which comprises blending the continuous phase-forming resin with the dispersoid-forming component (resin component, fibrous component, etc.) in the conventional manner (e.g. melt-blending method, tumbler method, etc.) where necessary, melt-mixing them, and extruding the mixture from a T-die, a ring die, or the like into a film form. The orientation of the dispersed phase can be achieved by, for example, (1) the method comprising giving a draft (or draw) to form the film in the course of extrusion, (2) the method comprising stretching the extruded film monoaxially, or (3) a combination of the methods (1) and (2). The light-scattering film can also be obtained by (4) the method which comprises mixing the materials (melt-kneading components) together in solution and forming the film by use of the mixture by, for example, a casting method.

The melting temperature is not lower than the melting points of the resins (continuous phase resin, dispersed phase resin), for example about 150 to 290° C., preferably about 200 to 260° C.

The draw ratio (draft) may for example be about 5 to 80, preferably about 10 to 60, more preferably about 20 to 40.

The stretching factor (multiples) may for example be about 1.1 to 50 (e.g. about 3 to 50), preferably about 1.5 to 30 (e.g. about 5 to 30).

When the drawing and stretching are conducted in combination, the draw ratio may for example be about 2 to 10, preferably about 2 to 5, and the stretching factor may for example be about 1.1 to 20 (e.g. about 2 to 20), preferably about 1.5 to 10 (e.g. about 3 to 10).

The preferred stretching technology includes the method of subjecting the film (for example, a formed (extruded or cast) and cooled film) to monoaxial stretching. Compared with the method of forming a film under draft, the aspect ratio of the dispersed phase can be easily increased by this stretching.

The method for monoaxial stretching is not particularly restricted but includes the method in which both ends of a solidified film are pulled in opposite directions (pull stretching), the method using two or more pairs of opposed rollers (2-roll sets) arranged serially (e.g. in a series of 2 pairs) wherein the film is passed over the rollers constituting each roll set by guiding it through the respective roll nips and stretched by driving the 2-roll set on the pay-out side at a speed higher than the speed of the 2-roll set on the feed side (inter-roll stretching), and the method in which the film is passed through the nip of a pair of opposed rollers and stretched under the roll pressure (roll calendering).

The preferred monoaxial stretching technology includes inter-roll stretching and roll-calendering. These methods facilitate the mass production of film. Particularly by roll calender method, not only a noncrystalline resin but also a crystalline resin can be easily stretched. Thus, when a resin sheet is stretched monoaxially, usually the trouble of "neck-in", the phenomenon of local reduction in the thickness and width of the film, tends to occur. In the roll calender method, however, the trouble of "neck-in" can be precluded so that the films tretching operation is stabilized. Since there is no change (reduction) in film width before and after stretching and the film thickness in the transverse direction can be made uniform so that the light-scattering characteristic can be uniformized in the transverse direction of the film, the quality assurance of the product be facilitated, and the useful rate (yield) of the film be improved. Furthermore, the stretching factor can be freely selected from a broad range. In addition, in roll calendering method, wherein the film width can be maintained before and after stretching, the reciprocal of the rate of reduction in film thickness is approximately equal to the stretching factor.

The roll pressure for roll calendering may for example be about $9.8 \times 10^3$ to $9.8 \times 10^6$ N/m, preferably about $9.8 \times 10^4$ to $9.8 \times 10^6$ N/m.

The stretching factor can be selected from a broad range and may for example be about 1.1 to 10, preferably about 1.3 to 5, more preferably about 1.5 to 3. The roll calendering can be carried out at a thickness reduction rate setting of about 0.9 to 0.1, preferably about 0.77 to 0.2, more preferably about 0.67 to 0.33.

The stretching temperature is not particularly restricted inasmuch as the film can be stretched and may be over the melting point or glass transition point of the dispersoid resin (dispersed phase resin). Moreover, when a resin having a glass transition point or melting point higher than that of the dispersoid resin (for example, a resin having a Tg or melting point higher by about 5 to 200° C., preferably about 5 to 100° C.) is used as the continuous phase-forming resin and the film is monoaxially stretched while the dispersoid resin is melted or softened, the aspect ratio of the dispersed phase particles can be increased because the dispersoid resin is by far readily deformed as compared with the continuous phase resin so that a film having a particularly large anisotropy of light scattering can be obtained. The preferred stretching temperature may for example be about 110 to 200° C., preferably about 130 to 180° C. The calender roll temperature, in case the continuous-phase resin is a crystalline resin, may be below the melting point of the resin or in the neighborhood of the melting point and, in case the continuous-phase resin is a noncrystalline resin, may be a temperature below the glass transition point and in the neighborhood of the glass transition point.

Figure 5:
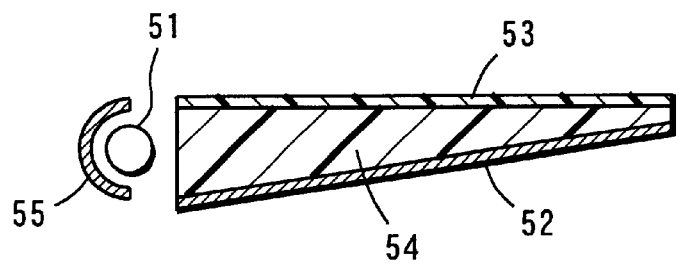
FIG. 5 is a shematic cross-section view of a backlight component for use in a transmission type liquid crystal display device.
Figure 6:
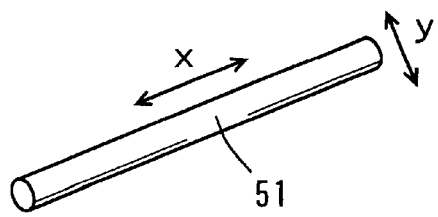
FIG. 6 is a shematic perspective view of an light projector means.
Figure 7:
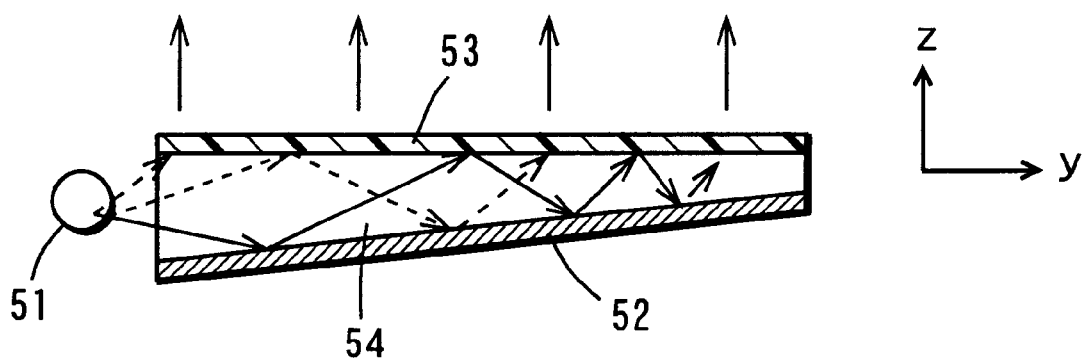
FIG. 7 is a shematic cross-section view illustrating the emission distribution of the backlight component shown in FIG. 5.

The light-scattering film according to the present invention can be used in display devices (such as a transmission type liquid crystal display device). This display device may for example comprise a display module (e.g. a transmission type liquid crystal display module) and, as disposed behind the module, a tubular projector means (e.g. a backlight such as a fluorescent tube), with the light-scattering film of the invention being positioned forwardly of the projector means. Here, the light-scattering film may be disposed in front of the display module or between the display module and the projector means. For example, the light-scattering film of the present invention can be used as the diffuser shown in FIG. 4 or FIG. 5.

In the above display device, the light-scattering film of the present invention is disposed in such a manner that the X-axis of the film is aligned with the longitudinal direction (the direction of the X-axis) of the light projector means (light source). Moreover, the Y-axis of the film is aligned with the direction of the Y-axis which is normal to the longitudinal direction of the projector means. On the other hand, the light from the light projector means has a uniform emission distribution in the direction of the X-axis but the emission distribution in the direction of the Y-axis is not uniform. When the light-scattering film is disposed with respect to such a light projector mean, the film gives a small scattering of light in the direction of the X-axis and a large scattering of light in the direction of the Y-axis so that the light in the direction of the X-axis, which is uniform, is little scattered but only the non-uniform light in the direction of the Y-axis is highly scattered to make the emission distribution uniform. Therefore, the emission distribution can be uniformized while the decrease in luminance is suppressed so the generation of streaks (linear dark areas) on the display screen can be inhibited.

In installing the light-scattering film, the direction of the X-axis of the film need not be exactly aligned with the longitudinal direction (the direction of the X-axis) of the light projector means (light source) but may be allowed to deviate somewhat inasmuch as the emission distribution can be uniformized. The angle between the longitudinal direction of the light projector means and the X-axis of the film may for example be about 0 to 20°, usually about 0 to 10°.

The light-scattering film of the present invention can be utilized in other kinds of display devices, such as the reflection type liquid crystal display device and the projection television. In applying the light-scattering film to a reflection type liquid crystal display device, the light-scattering film can be disposed to traverse the light path (the path of incidence, the path of reflection, etc.) of the liquid crystal (LC) cell having a liquid crystal sealed therein. For example, in the reflection type liquid crystal display device depicted in FIG. 8, the light-scattering film of the present invention can be disposed in the position of diffuser 83. When the light-scattering film is applied to a reflection type liquid crystal display device, a specialized reflection type LC display device varying in the angle of visual field between the X-axis direction and the Y-axis direction can be constructed because the diffusability of light by the film is large in the Y-axis direction and small in the X-axis direction. Moreover, when the light-scattering film has directionality, there can be obtained a display device having a high image clarity and a high display directionality.

When the light-scattering film is applied to projection television, the light-scattering film can be used as the lenticular lens of the projection TV screen. Because of its high transparency and high anisotropy of diffused light, the use of the light-scattering film of the present invention results in an increased TV luminance. Furthermore, when a resin having high-melting point is used as the continuous-phase resin, a high heat resistance can be imparted to the lenticular lens.

Because the dispersed phase particles have a specific (herein-defined) morphology (geometry) and orientation, the light-scattering film of the present invention is capable of diffusing light with high anisotropy. In particular, because the film has a specific (herein-defined) light scattering characteristics, a uniform emission distribution can be realized with close tolerances and without compromise in luminance even when a light projector means having an anisotropic (directional) emission distribution (such as a tubular light projector means) is employed. Furthermore, the film can be provided with high transparency. Therefore, this light-scattering film can be utilized with advantage in display devices, for example a transmission type liquid crystal display device utilizing a light projectors having an anisotropy of emission distribution (e.g. backlight). Moreover, when the film is applied to a reflection type liquid crystal display device, the high clarity of displayed data can be maintained and a high display directionality can be imparted. Furthermore, the film can be used as a lenticular lens having good heat resistance and high light scattering anisotropy.

EXAMPLES

The following examples illustrate the present invention in further detail without defining the scope of the invention.

It should be understood that the films obtained in the examples and comparative example were evaluated by the following methods.

[Anisotropy]

Using the measuring system illustrated in FIG. 1, one side of the film obtained in each of the examples and comparative example was irradiated with laser light and, of the transmitted light, the intensity F of scattered light at the diffusion angle $\theta$ was measured. The stretching direction of the film (the direction of the major axis of the particulate dispersed phase) was designated as X and the direction normal to this direction was designated as Y.

[Uniformity]

In the transmission type liquid crystal display device illustrated in FIG. 4, the film obtained in each of the examples and comparative example was used as the diffuser 43 and the uniformity of the emission surface was evaluated according to the following criteria. The film was disposed in such a manner that the direction of its X-axis (the major axis of the dispersed phase particle) would be in parallel with the longitudinal direction of the fluorescent tube. With any of the films, no uniform image display could be obtained when the film was disposed with its X-axis oriented perpendicular to the axial direction of the fluorescent tube.

A: Extremely high uniformity of the emission surface
B: High uniformity of the emission surface
C: Streaks are observed.

[Directionality]

Figure 8:
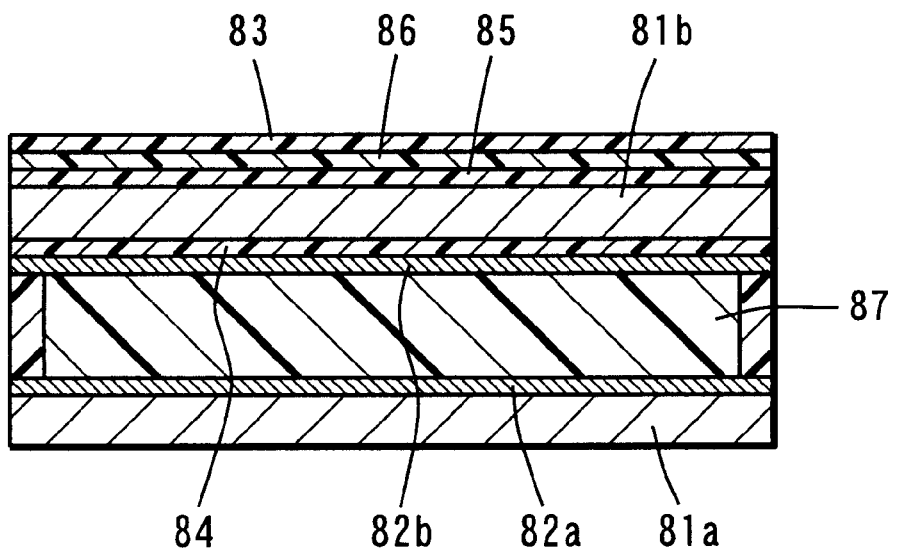
FIG. 8 is a shematic cross-section view of a reflection type liquid crystal display device.

As the diffuser 83 of the reflection type liquid crystal displace device illustrated in FIG. 8, the films obtained in the examples and comparative example were respectively used. The directionality of reflected light was visually evaluated according to the following criteria.

A: Extremely high directionality
B: High directionality
C: No directionality

[Heat Resistance]

Using the light source for projection television, the films obtained in the examples and comparative example were irradiated. The irradiated films were visually inspected and evaluated according to the following criteria.

A: No deformation of the film
B: The film is deformed but the uniformity of light scattering is sustained
C: The film is deformed and the uniformity of light scattering is lost.

Example 1

As the continuous-phase resin, 95 weight parts of crystalline PP (polypropylene, Grand Polymer Co.; F133, refractive index 1.503) and, as the dispersoid resin, 5 weight parts of GPPS (a general purpose polystyrenic resin, Daicel Chemical Industries, Ltd.; GPPS #30, refractive index 1.589) were used. The refractive index differential between the two resins was 0.086.

The above continuous-phase resin and dispersoid resin were dried at 70° C. for about 4 hours and kneaded in a Banbury mixer. Using an extruder, the kneaded product was melted at about 240° C. and extruded from a T-die at a draw ratio of about 3 onto a cooling drum set to a surface temperature of 25° C. (melt-molding). The thickness of the film thus obtained was 0.3 mm. Observation of the film by scanning electron microscopy (SEM) revealed that the mean particle size (diameter) of the dispersed phase was about 2 $\mu$m.

This film was monoaxially stretched by the inter-roll stretching method (150° C., stretching factor=×5) to obtain a 0.07 mm-thick film. Observation of this film by SEM revealed that the dispersed phase particle was shaped like an elongated football, with a mean major axis dimension of about 30 $\mu$m and a mean minor axis dimension of about 0.25 $\mu$m.

Comparative Example 1

As the continuous-phase resin, 95 weight parts of low-density PE (polyethylene-series resin; Ube Kosan; LDPEG109, refractive index 1.51) and, as the dispersed phase resin, 5 parts of GPPS (a general purpose polystyrene-series resin, Daicel Chemical Industries, Ltd.; GPPS#30, refractive index 1.589) were used. The refractive index differential between the two resins was 0.079.

The melt-molding procedure of Example 1 was otherwise repeated to give a 0.3 mm-thick film. Observation of the film by SEM revealed that the dispersed phase had a mean particle size of 2 $\mu$m.

This film was monoaxially stretched by the inter-roll stretching method (100° C., stretching factor=×4) to give a 0.08 mm-thick film. Observation of the film by SEM revealed that the dispersed phase particles were spherical.

Example 2

As the continuous-phase resin, 95 weight parts of crystalline PP (polypropylene, Grand Polymer Co.; F133, refractive index 1.503); as the dispersed phase resin, 4.6 weight parts of noncrystalline copolyester PET-G (polyester-series resin, Eastman Chemical; Eastar PETG6763, refractive index 1.567); and as the compatibilizing agent, 0.4 weight part of epoxidized diene-series block copolymer resin (Daicel Chemical; Epofriend AT202; styrene/butadiene=70/30 (by weight), epoxy equivalent 750, refractive index ca 1.57) were used. The refractive index differential between the continuous-phase resin and the dispersed phase resin was 0.064.

The melt-molding procedure of Example 1 was otherwise repeated to give a film having a thickness of 0.3 mm. Observation of the film by SEM revealed that the dispersed phase had a mean particle size of about 2 $\mu$m. It was also found that the compatibilizing agent had adhered to the periphery of the dispersed phase.

The film was roll calendered as in Example 1 to give a 0.07 mm-thick film. Observation of this film by SEM revealed that the dispersed phase was filamentous with a mean major axis dimension of about 40 $\mu$m and a mean minor axis dimension of about 0.2 $\mu$m.

Example 3

As the continuous-phase resin, 63 weight parts of non-crystalline copolyester PET-G (polyester-series resin, Eastman Chemical; Eastar PETG6763, refractive index 1.567); as the dispersed phase resin, 30 weight parts of GPPS (a general purpose polystyrene-series resin, Daicel Chemical Industries, Ltd.; GPPS#30, refractive index 1.589); and as the compatibilizing agent, 7 weight parts of epoxidized diene-series block copolymer resin (Daicel Chemical Industries, Ltd.; Epofriend AT202; styrene/butadiene=70/30 (by weight), epoxy equivalent 750, refractive index ca 1.57) were used. The refractive index differential between the continuous-phase resin and the dispersed phase resin was 0.022.

Except that the draw ratio was set to about 30, the melt-molding procedure of Example 1 was repeated to give a film having a thickness of 0.01 mm. Observation of the film by SEM revealed that the particulate dispersed phase was shaped like an elongated football having a mean major axis dimension of about 20 $\mu$m and a mean minor axis dimension of about 0.2 $\mu$m and that the dispersed particles had been line up in the draw direction. Moreover, the compatibilizing agent was observed as adherent to the periphery of the dispersed phase.

Example 4

As the continuous-phase resin, 60 weight parts of crystalline PP (polypropylene, Grand Polymer; F109BA, refractive index 1.503); as the dispersed phase resin, 36 weight parts of noncrystalline copolyester PET-G (polyester-series resin, Eastman Chemical; Eastar PETG GN071, refractive index 1.567); and as the compatibilizing agent, 4 weight parts of epoxidized diene-series block copolymer (Daicel Chemical Industries, Ltd; Epofriend AT202; styrene/butadiene=70/30 (by weight), epoxy equivalent 750, refractive index ca 1.57) were used. There fractive index differential between the continuous-phase resin and the dispersed phase resin was 0.064.

The continuous-phase resin, dispersed phase resin and compatibilizing agent were dried at 70° C. for about 4 hours and, then, kneaded (blended) in a Banbury mixer. Using an extruder (a single-layer extruder), the above kneaded product (blend) was melted at about 240° C. and extruded from a T-die at a draw ratio of about 3 onto a cooling drum set to a surface temperature of 25° C. The thickness of the film obtained was about 0.2 mm (200 $\mu$m). Observation of the film by SEM revealed that the particulate dispersed phase had a configuration substantially identical with that of the dispersed phase observed in Example 1.

This film was monoaxially stretched by the roll calender method to give a film having a thickness of 100 $\mu$m. This roll calendering was carried out at a temperature of 130° C., a stretching factor (calendering ratio) of about ×2, and a thickness reduction rate (film thickness before calendering/film thickness after calendering)=about 0.5, and a width reduction rate (100−(film width before calendering/film width after calendering)×100) of about 3%. Observation of the film by SEM revealed that the particulate dispersed phase had a markedly elongated filamentous shape having a mean major axis dimension of about 30 $\mu$m and a mean minor axis dimension of about 1.5 $\mu$m.

The anisotropy, uniformity, directionality and heat resistance of the films obtained in the examples and comparative example were evaluated. The results are shown in Table 1. In addition, the anisotropy of the film according to Example 1 is diagrammatically represented in FIG. 3.

characteristic $Fy(\theta)$ satisfy the following expression over a range of $\theta=2$ to $30°$:

$$Fy(\theta)/Fx(\theta)>10.$$

3. An anisotropic light-scattering film as claimed in claim 1 or 2 wherein the film is composed of a continuous phase and a particulate dispersed phase which differ in the index of refraction by not less than 0.001, the mean aspect ratio of the dispersed phase particles is not smaller than 1 and the major axes of the dispersed phase particles are oriented in the direction of the X-axis of the film.

4. An anisotropic light-scattering film as claimed in claim 3 wherein the mean aspect ratio of the dispersed phase particles is 5 to 500.

5. An anisotropic light-scattering film as claimed in claim 3 wherein the mean dimension of the minor axes of the dispersed phase particles is 0.1 to 10 $\mu$m.

6. An anisotropic light-scattering film as claimed in claim 3 wherein the continuous phase is composed of a crystalline olefin resin and the dispersed phase is composed of a noncrystalline polyester-series resin.

7. An anisotropic light-scattering film as claimed in claim 6 further containing a compatibilizing agent.

8. An anisotropic light-scattering film as claimed in claim 7 wherein the compatibilizing agent is an epoxidized diene-series block copolymer.

9. An anisotropic light-scattering film as claimed in claim 7 wherein the compatibilizing agent is a block copolymer composed of a conjugated diene block or a corresponding partially hydrogenated block and an aromatic vinyl block and the double bonds in said conjugated diene block have been epoxidized in part or as a whole.

10. An anisotropic light-scattering film as claimed in claim 3 wherein the relative amount of the continuous phase

TABLE 1

| | Aspect ratio | Dimension of minor axis of particulate dispersed phase ($\mu$m) | Light-scattering anisotropy $Fy(\theta)/Fx(\theta)$ | | | Uniformity | Directionality | Heat resistance |
|---|---|---|---|---|---|---|---|---|
| | | | $\theta = 2°$ | $\theta = 4°$ | $\theta = 15°$ | | | |
| Example 1 | 120 | 0.25 | 22 | 118 | 263 | A | A | B |
| Example 2 | 200 | 0.2 | 25 | 151 | 354 | A | A | B |
| Example 3 | 100 | 0.2 | 9.3 | 14 | 70 | B | B | — |
| Example 4 | 20 | 1.5 | 2.0 | 6 | 200 | B | A | A |
| Compar. Ex. 1 | 1 | — | 1.1 | 1.1 | 1 | C | C | C |

Figure 3:
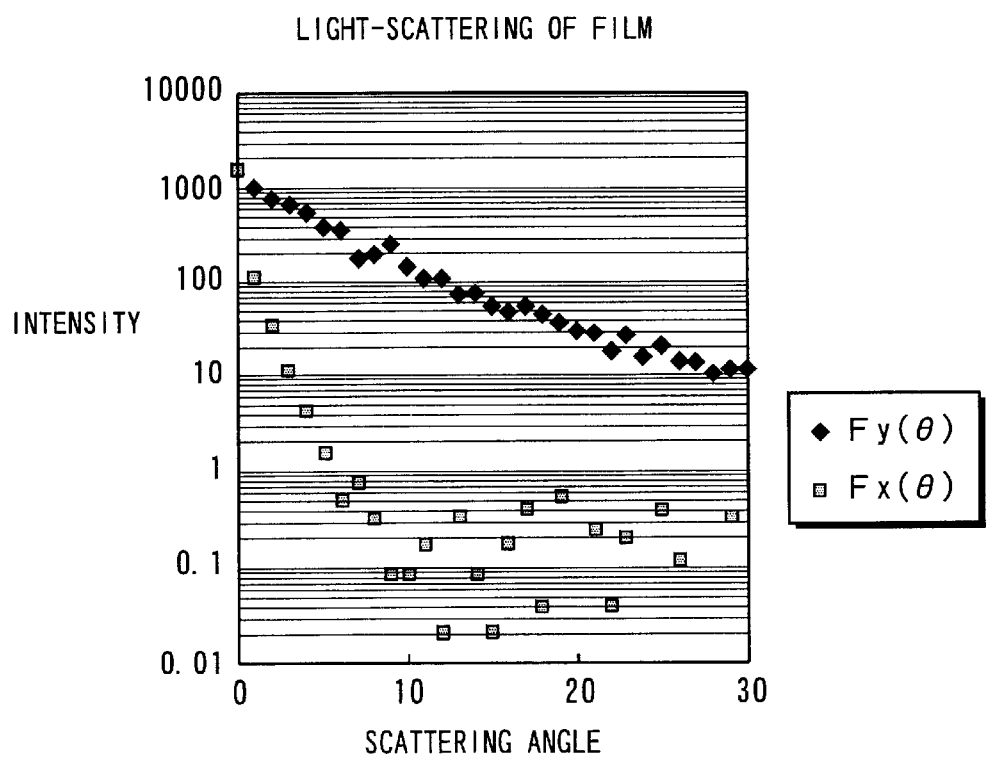
FIG. 3 is a graph showing the intensity of scattered light as measured with the film according to Example 1.

It is apparent from Table 1 and FIG. 3 that the films according to the examples have high anisotropy as compared with the film prepared in the comparative example. Moreover, the former films were found to be superior in uniformity, directionality and heat resistance as well.

What is claimed is:

1. An anisotropic light-scattering film capable of scattering incident light in the direction of advance thereof and having a scattering characteristic $F(\theta)$ satisfying the following expression representing the relation between the angle of light scattering $\theta$ and the intensity of scattered light $F$ over a range of $\theta=4$ to $30°$:

$$Fy(\theta)/Fx(\theta)>5$$

wherein $Fx(\theta)$ represents the scattering characteristic in the direction of the X-axis of the film and $Fy(\theta)$ represents the scattering characteristic in the direction of the Y-axis of the film.

2. An anisotropic light-scattering film as claimed in claim 1 wherein the scattering characteristic $Fx(\theta)$ and scattering and the dispersed phase is [continuous phase/dispersed phase]=99/1 to 50/50 (weight ratio).

11. An anisotropic light-scattering film as claimed in claim 8 comprising a crystalline polypropylene-series resin constituting the continuous phase, a noncrystalline copolyester-series resin constituting the dispersed phase and an epoxidized diene-series block copolymer constituting the compatibilizing agent, the relative amount of the continuous phase and dispersed phase is [former/latter]=99/1 to 50/50 (weight ratio), and the relative amount of the dispersed phase and compatibilizing agent is [former/latter]=99/1 to 50/50 (weight ratio).

12. An anisotropic light-scattering film as claimed in claim 1 wherein the film is formed with surface irregularities extending in the direction of the X-axis of the film.

13. A method of producing the anisotropic light-scattering film claimed in claim 1 which comprises melt-kneading a resin constituting the continuous phase and a resin constituting the dispersed phase and extruding the kneaded product to form a film under drawing.

14. A method of producing the anisotropic light-scattering film claimed in claim 1 which comprises melt-kneading a resin constituting the continuous phase and a resin constituting the dispersed phase, extruding the kneaded product to form a film, and stretching the film monoaxially after solidification.

15. A method of producing an anisotropic light-scattering film as claimed in claim 14 wherein the film is monoaxially stretched by calendering.

16. A method as claimed in claim 14 wherein the film is stretched at a temperature higher than the melting point or glass transition point of the dispersed phase resin.

17. A display device comprising an display module, a tubular light projector means disposed behind said display module and adapted to project light to said module and the anisotropic light-scattering film of claim 1 as disposed forwardly of said light projector means, wherein said anisotropic light-scattering film being disposed with its X-axis oriented in the longitudinal direction of said projector means.

18. A display device as claimed in claim 17 wherein the image display module is a transmission type liquid crystal display module.

19. A reflection type liquid crystal display device comprising the anisotropic light-scattering film of claim 1 as disposed in the light path of a reflection type liquid crystal display module.

20. A lenticular lens for projection television which comprises the anisotropic light-scattering film of claim 1.

* * * * *